United States Patent
Codilian

(10) Patent No.: US 7,050,258 B1
(45) Date of Patent: May 23, 2006

(54) DISK DRIVE AND METHOD FOR IMPROVED DISK ROTATION CONTROL

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 212 days.

(21) Appl. No.: 10/329,163

(22) Filed: Dec. 24, 2002

(51) Int. Cl.
*G11B 15/46* (2006.01)

(52) U.S. Cl. .................................................. 360/73.03

(58) Field of Classification Search ............. 360/73.03, 360/78.04, 69; 318/430, 599; 310/432
See application file for complete search history.

(56) References Cited

U.S. PATENT DOCUMENTS

| | | | | |
|---|---|---|---|---|
| 4,979,055 A | * | 12/1990 | Squires et al. | 360/69 |
| 5,473,230 A | | 12/1995 | Dunn et al. | |
| 5,589,996 A | * | 12/1996 | Patrick et al. | 360/73.03 |
| 5,592,345 A | * | 1/1997 | Carobolante et al. | 360/73.03 |
| 6,097,564 A | * | 8/2000 | Hunter | 360/78.04 |
| 6,388,832 B1 | * | 5/2002 | Dobbek et al. | 360/73.03 |

* cited by examiner

*Primary Examiner*—K. Wong
(74) *Attorney, Agent, or Firm*—Jonathan E. Prejean, Esq.; Robroy R. Fawcett, Esq.

(57) ABSTRACT

The invention relates to a disk drive and related method for improved disk rotation rate control in the presence of seek operations. A spindle motor rotates a spindle, supporting at least one disk with a magnetic recording surface, in response to a motor current. The actuator radially positions a transducer head over the recording surface. The motor is subjected to a torque load component related to the transducer head radial position. The spindle motor controller has a feedback control loop and a feedforward control element. The feedback control loop maintains a relatively constant spindle rotation rate based on a difference error between a predetermined target spindle rotation rate parameter and a measured spindle rotation rate parameter. The feedforward control element, in conjunction with a seek operation, adjusts the motor current based on a target head radial position with respect to an initial head radial position.

24 Claims, 5 Drawing Sheets

DISK DRIVE AND METHOD FOR IMPROVED DISK ROTATION CONTROL

BACKGROUND OF THE INVENTION

1. Field of the Invention

The present invention relates to rotating magnetic disk drives, and more particularly, to improving disk rotation rate control.

2. Description of the Prior Art and Related Information

In order to remain competitive, disk drive manufacturers must continually provide increased data storage capacity while rigidly controlling disk drive manufacturing cost. High storage capacity disk drives often use embedded servo wedges that extend radially across the disk surface defining radial position information. Thus, at periodic intervals, a disk control system switches between a data read/write mode and a servo mode at transitions between data storage sectors and the servo wedges. Guard regions, containing neither servo information nor user data, are placed between the data storage sectors and the servo wedges to allow for inaccuracies in the periodic timing and arrival of the transitions between the data storage sectors and the servo wedges. The size of the guard regions impact the storage capacity of the disk drive.

Accordingly, there exists a need for reducing the inaccuracies that affect the size of the guard regions at the transitions between the data storage sectors and the servo wedges.

SUMMARY OF THE INVENTION

The present invention may be embodied in a disk drive and related method for improved disk rotation rate control in the presence of seek operations. The disk drive includes a spindle, a spindle motor, spindle motor controller, and an actuator. The spindle motor rotates the spindle in response to a motor current. The rotating spindle rotates at least one disk having at least one recording surface. Each recording surface has tracks at discrete radial locations. The actuator radially positions a transducer head over each recording surface. The motor is subjected to a torque load component related to the transducer head radial position. The spindle motor controller controls the motor current. The spindle motor controller has a feedback control loop and a feedforward control element. The feedback control loop maintains a relatively constant spindle rotation rate based on a difference error. The feedforward control element, in conjunction with a seek operation from an initial head radial position to a target head radial position, adjusts the motor current based on the target head radial position with respect to the initial head radial position, to lessen the effects of the torque load component.

In more detailed features of the invention, the spindle motor controller may suspend the feedback control loop, and the feedforward control element may adjust the motor current to a predicted current at a commencement of the seek operation, and hold the motor current at the predicted current during the seek operation or for a predetermined time after the commencement of the seek operation. Each recording surface may be a magnetic recording surface. The difference error may be determined based on a difference between a predetermined target spindle rotation rate parameter and a measured spindle rotation rate parameter.

In other more detailed features of the invention, the motor current may be adjusted by an amount based on a difference between a first ascertained motor current corresponding to the initial head radial position and a second ascertained motor current corresponding to the target head radial position. Each of the first ascertained motor current and the second ascertained motor current may be ascertained based on an interpolation using motor current measurements corresponding to at least first and second calibration positions. The motor current measurement at each of the calibration positions may be performed using more than 100 disk rotations, such as over 300 disk rotations. The first calibration position may be at about one-third of the distance between an inner-most track radial location and an outer-most track radial location, and the second calibration position may be at about two-thirds of the distance between the inner-most track radial location and the outer-most track radial location. Alternatively, the first calibration position may be located substantially at the inner-most track radial position, and the second calibration position may be located substantially at the outer-most radial position.

In other more detailed features of the invention, a difference between the current measurements at the first and second calibration positions may be between 2 and 4 percent and between 4 and 6 percent.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
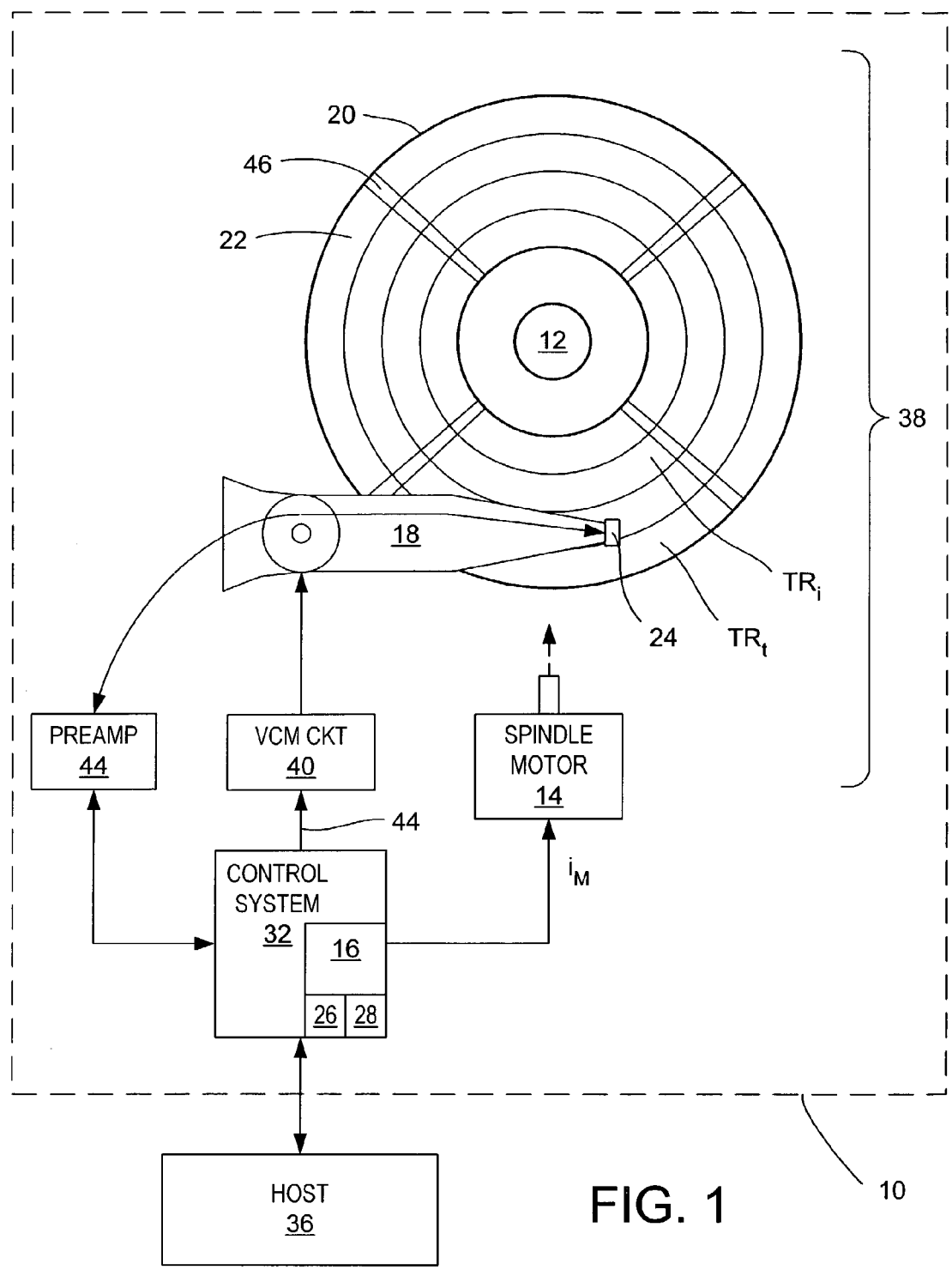
FIG. 1 is a block diagram of a disk drive having improved disk rotation rate control, according to the present invention.
Figure 2:
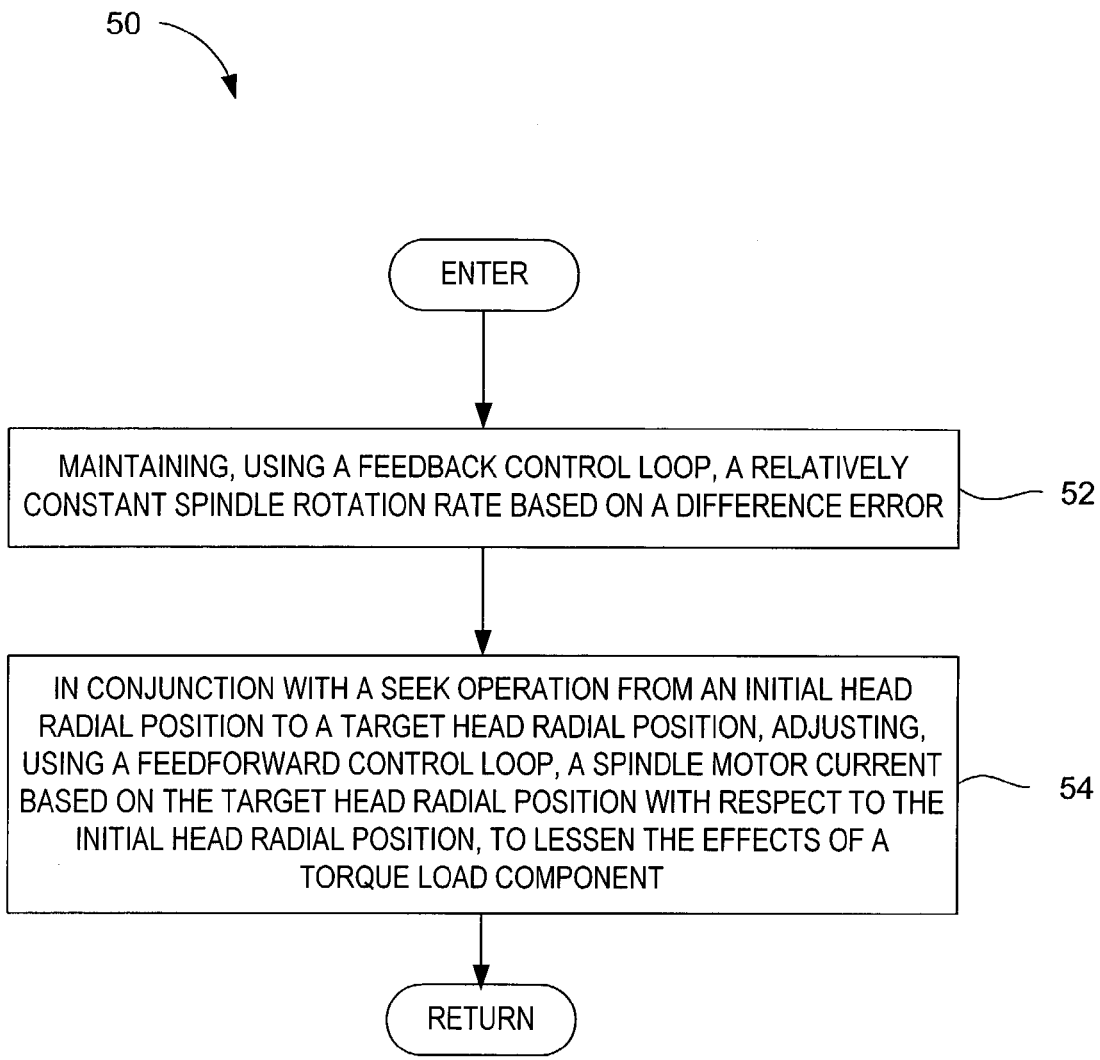
FIG. 2 is a flow chart illustrating a method for improving disk rotation rate control, according to the present invention.
Figure 3:
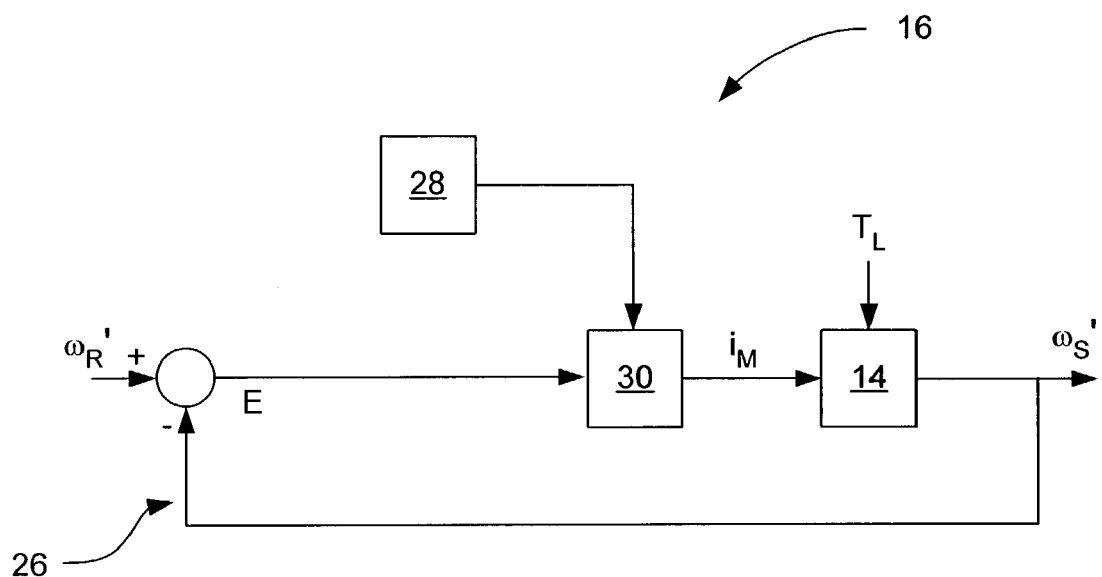
FIG. 3 is block diagram of a spindle motor controller having a feedback control loop and a feedforward control element for improving disk rotation rate control in a disk drive, according to the present invention.

With reference to FIGS. 1 through 3, the present invention may be embodied in a disk drive 10 (FIG. 1) and related method 50 (FIG. 2) for improved disk rotation rate control in the presence of seek operations. The disk drive includes a spindle 12, a spindle motor 14, spindle motor controller 16, and an actuator 18. The spindle motor rotates the spindle in response to a motor current $i_M$. The rotating spindle rotates at least one disk 20 having at least one magnetic recording surface. Each recording surface has tracks 22 at discrete radial locations. The actuator radially positions a transducer head 24 over each magnetic recording surface. The motor is subjected to a torque load component $T_L$ related to the transducer head radial position. The spindle motor controller controls the motor current. The spindle motor controller 16 (FIG. 3) has a feedback control loop 26 and a feedforward control element 28. The feedback control loop maintains a relatively constant spindle rotation rate based on a difference error E between a predetermined target spindle rotation rate parameter $\omega_R'$ and a measured spindle rotation rate parameter $\omega_S'$ (step 52). The feedforward control element, in conjunction with a seek operation from an initial head radial position $TR_i$ to a target head radial position $TR_t$, adjusts the motor current based on the target head radial position with respect to the initial head radial position, to lessen the effects of the torque load component (step 54).

Figure 4:
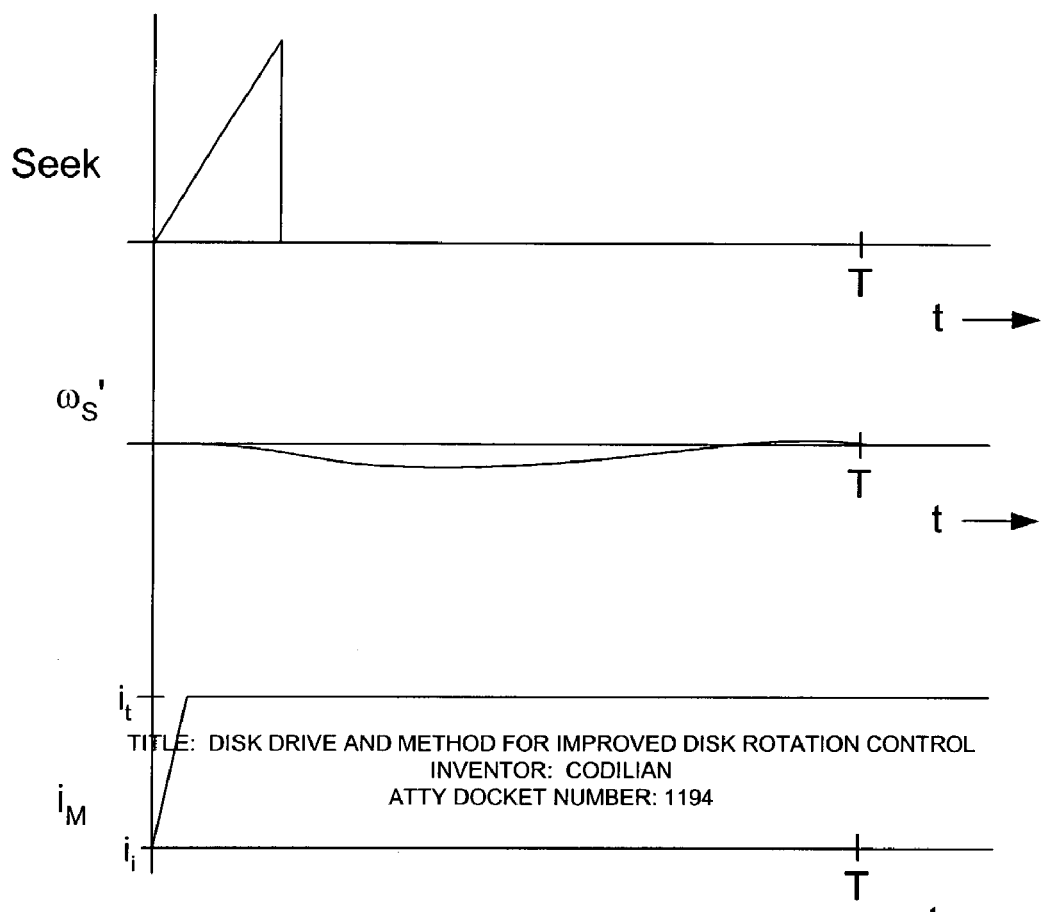
FIG. 4 is a timing diagram showing a spindle motor current and an improved disk rotation rate, in relation to a seek operation, according to the present invention.

With reference to FIG. 4, the feedforward control element 28 may adjust the spindle motor current $i_M$ to a predicted current $i_t$, from an initial current $i_i$, at a commencement of the seek operation. The initial current may be a running average of the spindle motor current before the commencement of the seek operation. The feedforward control element may hold the motor current at the predicted current $i_t$ for a predetermined time T after the commencement of the seek operation. Advantageously, the spindle motor controller 16 may suspend the feedback control loop 26 during the predetermined time.

Figure 6:
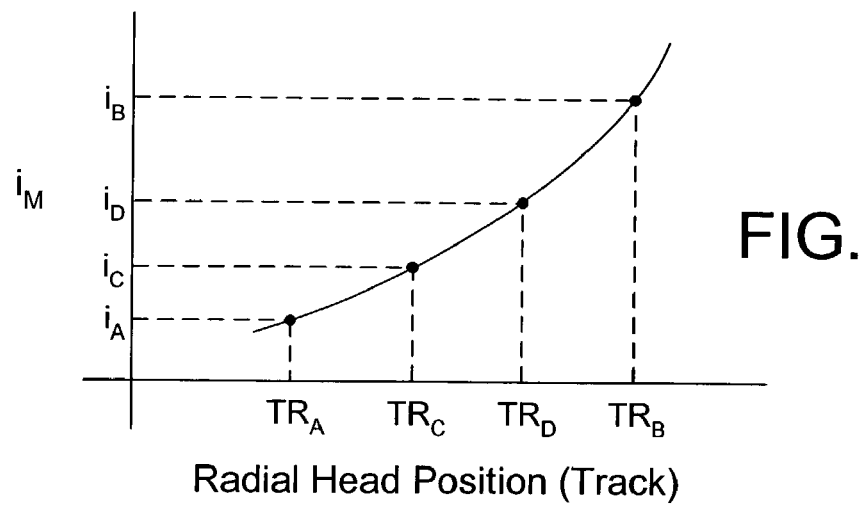
FIG. 6 is a graph diagram for ascertaining a predicted spindle motor current based on an initial motor current, and calibrated motor currents represented by a nonlinear curve, for improving disk rotation rate control in a disk drive, according to the present invention.
Figure 7:
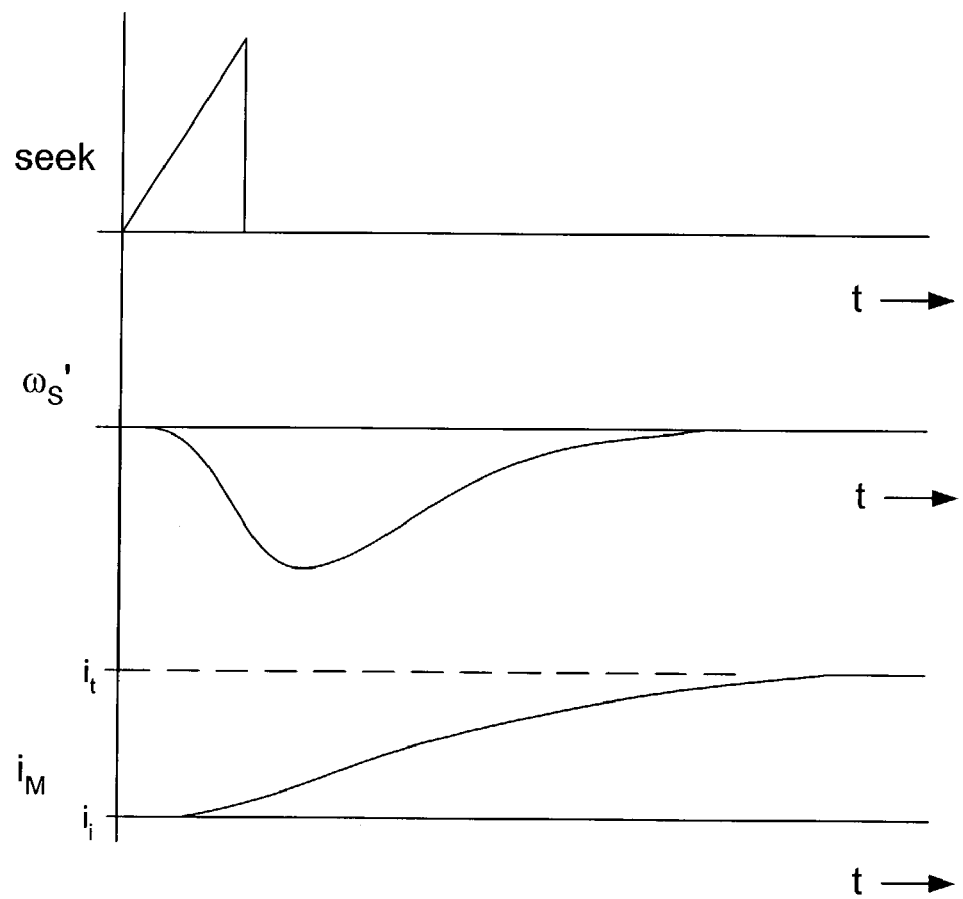
FIG. 7 is a timing diagram showing a spindle motor current and a disk rotation rate, without improvement, in relation to a seek operation.

The use of the feedforward control element 28 to predictively adjust the motor current $i_M$ reduces the effects of the head position based torque load component $T_L$ resulting in reduced variation in the spindle rotation rate $\omega_S'$. By comparison, as shown in FIG. 6, without the feedforward control element, the effects of the torque load component on the spindle rotation rate is more pronounced based largely on the inherent response delay of the feedback control loop 26. A common technique for measuring the spindle rotation rate is performed by measuring the time period of each disk rotation. Thus, the spindle rotation rate parameter may be a time period representing the rotation rate.

A difference between the initial motor current $i_i$ and the target motor current $i_t$ is proportional to an differential motor current needed to cause the spindle motor 14 to generate an differential motor torque to offset the torque load component $T_L$. Advantageously, the differential current is based on the motor current difference because absolute current values may not accurately account for bearing aging, bearing grease temperature, windage, etc. The torque load component is primarily due to windage, an effect that couples a torque load on the disk 20 to the head radial position. The windage based torque load component is fairly compensated using the motor current difference that is added to the initial motor current to provide the predicted motor current.

Figure 5:
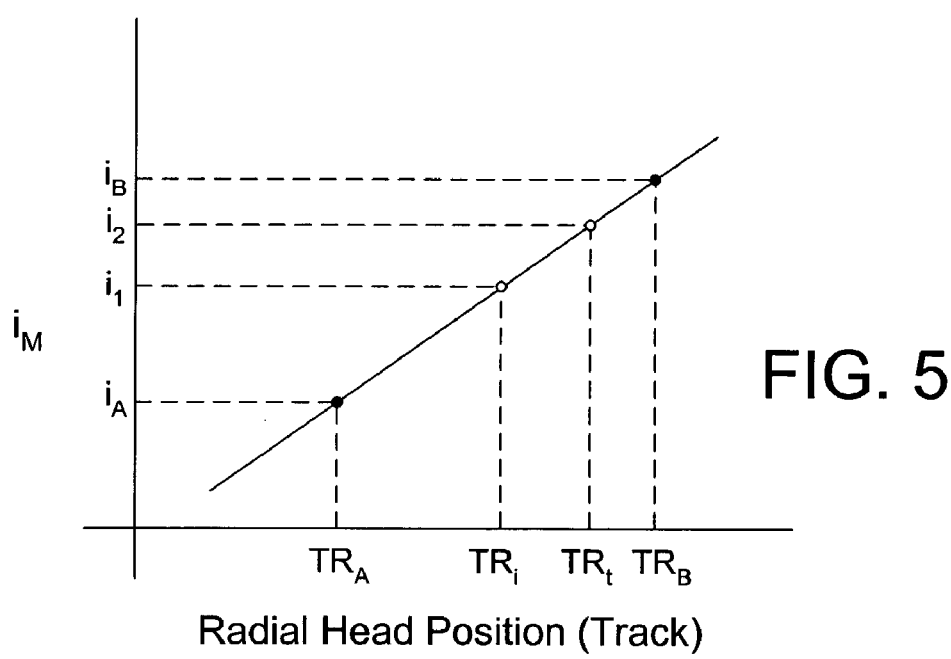
FIG. 5 is a graph diagram for ascertaining a predicted spindle motor current based on an initial motor current and initial and target transducer head radial positions, and using first and second calibrated motor currents, for improving disk rotation rate control in a disk drive, according to the present invention.

With reference to FIG. 5, a compensator 30 (FIG. 3) may adjust the initial motor current $i_i$, initially generated by the feedback control loop 26, by an amount, provided by the feedforward control element 28, based on a difference between a first ascertained motor current $i_1$ corresponding to the initial head radial position $TR_i$ and a second ascertained motor current $i_2$ corresponding to the target head radial position $TR_t$. Each of the first ascertained motor current and the second ascertained motor current may be ascertained based on an interpolation using motor current measurements $i_A$ and $i_B$, at first and second calibration positions $TR_A$ and $TR_B$, respectively. To reduce temperature effects, and the like, the motor current measurement at each of the first and second calibration positions may be performed using more than 100 disk rotations, such as over 300 disk rotations. The first calibration position may be located substantially at an inner-most track radial location, and the second calibration position may be located substantially at an outer-most track radial location. Additionally or alternatively, another calibration position may be located at about one-third of a distance between the inner-most track radial location and the outer-most track radial location, and another calibration position may be located at about two-thirds of the distance between the inner-most track radial location and the outer-most track radial location. A number of factors may influence the current measurement, $i_A$ and $i_B$. The effect of these factors may be diminished using averaging. Current measurements may be made at the first calibration position $TR_A$ and stored. Then measurements may be made at the second calibration position and stored $TR_B$. Current measurements may be repeated, in an alternating manner, at the first calibration position, and then at second calibration position. Then the current measurements accumulated for the each calibration position may be separately averaged to generate an averaged current measurement for the first calibration position, and an averaged current measurement for the second calibration position.

A difference between the current measurements at the inner-most track radial location and at the outer-most track radial location may be between 2 and 4 percent for a first type spindle motor having, for example, a fluid bearing, and may be between 4 and 6 percent for a second type spindle motor having, for example, a ball bearing.

With reference to FIG. 5, the predicted spindle motor current may be defined by a nonlinear curve, with respect to the head radial position. A plurality of additional calibration positions, $TR_C$ and $TR_D$, may be used for determining the nonlinear curve. The curve may be modeled by an equation or reduced to a table for storage in memory and retrieval during operation. The table may include some entries that may be interpolated from adjacent current measurements.

The spindle motor controller 16 is included in a control system 32 (FIG. 2). The control system includes a sampled servo controller, and circuitry and processors that control a head-disk assembly (HDA) 38 and that provide an intelligent interface between a host 58 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA includes the spindle motor 14, the spindle 12, the disk 20, the actuator 18, a voice coil motor (VCM) circuit coupled between the actuator and the control system, and a preamplifier 44 coupled between the transducer head 24 and the control system.

The magnetic media surface is accessed using the head 24. The tracks 22 on the media surface may be divided into the storage segments. Each storage segment may begin with a servo sector 46 which is followed by data sectors. The servo sector for a storage segment corresponds to an intersection with radially-extending embedded servo wedges.

What is claimed is:

1. A disk drive having improved disk rotation rate control in the presence of seek operations, comprising:

a spindle for rotating at least one disk having at least one recording surface, each recording surface having tracks at discrete radial locations;

an actuator for radially positioning, over each recording surface, a transducer head;

a spindle motor for rotating the spindle in response to a motor current, the motor being subjected to a torque load component related to a transducer head radial position; and a spindle motor controller for controlling the motor current, the spindle motor controller having:
- a feedback control loop for maintaining a relatively constant spindle rotation rate based on a difference error, and
- a feedforward control element that, in conjunction with a seek operation from an initial head radial position to a target head radial position, adjusts the motor current based on the target head radial position with respect to the initial head radial position, to lessen the effects of the torque load component, wherein the motor current is adjusted by an amount based on a difference between a first ascertained motor current corresponding to the initial head radial position and a second ascertained motor current corresponding to the target head radial position and each of the first ascertained motor current and the second ascertained motor current is ascertained based on an interpolation using motor current measurements corresponding to at least first and second calibration positions.

2. A disk drive having improved disk rotation rate control as defined in claim 1, wherein the feedforward control element adjusts the motor current to a predicted current.

3. A disk drive having improved disk rotation rate control as defined in claim 1, wherein the spindle motor controller suspends the feedback control loop, and the feedforward control element adjusts the motor control current to a predicted current at a commencement of the seek operation and holds the motor current at the predicted current for a predetermined time after the commencement of the seek operation.

4. A disk drive having improved disk rotation rate control as defined in claim 1, wherein the spindle motor controller suspends the feedback control loop and the feedforward control element adjusts the motor control current to a predicted current during the seek operation.

5. A disk drive having improved disk rotation rate control as defined in claim 1, wherein each recording surface is a magnetic recording surface.

6. A disk drive having improved disk rotation rate control as defined in claim 1, wherein the difference error is determined based on a difference between a predetermined target spindle rotation rate parameter and a measured spindle rotation rate parameter.

7. A disk drive having improved disk rotation rate control as defined in claim 1, wherein the motor current measurement at each of the calibration positions is performed over 300 disk rotations.

8. A disk drive having improved disk rotation rate control as defined in claim 1, wherein the motor current measurement at each of the calibration positions is performed using more than 100 disk rotations.

9. A disk drive having improved disk rotation rate control as defined in claim 1, wherein the first calibration position is at about one-third of a distance between an inner-most track radial location and an outer-most track radial location, and the second calibration position is at about two-thirds of the distance between the inner-most track radial location and the outer-most track radial location.

10. A disk drive having improved disk rotation rate control as defined in claim 1, wherein the first calibration position is located substantially at an inner-most track radial location, and the second calibration position is located substantially at an outer-most track radial location.

11. A disk drive having improved disk rotation rate control as defined in claim 1, wherein a difference between the current measurements at the first and second calibration positions is between 4 and 6 percent.

12. A disk drive having improved disk rotation rate control as defined in claim 1, wherein a difference between the current measurements at the first and second calibration positions is between 2 and 4 percent.

13. A method for improved disk rotation rate control in the presence of seek operations in a disk drive having a spindle for rotating at least one disk having at least one recording surface, each recording surface having tracks at discrete radial locations; an actuator for radially positioning a respective transducer head over each recording surface; a spindle motor for rotating the spindle in response to a motor current, the motor being subjected to a torque load component related to a transducer head radial position; and a spindle motor controller for controlling the motor current, the spindle motor controller having a feedback control loop and a feedforward control loop; the method comprising:
- maintaining, using the feedback control loop, the relatively constant spindle rotation rate based on a difference error; and
- in conjunction with a seek operation from an initial head radial position to a target head radial position, adjusting, using the feedforward control loop, the motor current based on the target head radial position with respect to the initial head radial position, to lessen the effects of the torque load component, wherein the motor current is adjusted by an amount based on a difference between a first ascertained motor current and a second ascertained motor current to the target head radial position and each of the first ascertained motor current and the second ascertained motor current is ascertained based on an interpolation using motor current measurements corresponding to at least first and second calibration positions.

14. A method for improved disk rotation rate control as defined in claim 13, wherein the feedforward control element adjusts the motor current to a predicted current.

15. A method for improved disk rotation rate control as defined in claim 13, wherein the spindle motor controller suspends the feedback control loop, and the feedforward control element adjusts the motor control current to a predicted current at a commencement of the seek operation and holds the motor current at the predicted current for a predetermined time after the commencement of the seek operation.

16. A method for improved disk rotation rate control as defined in claim 13, wherein the spindle motor controller suspends the feedback control loop, and the feedforward control element adjusts the motor control current to a predicted current during the seek operation.

17. A method for improved disk rotation rate control as defined in claim 13, wherein each recording surface is a magnetic recording surface.

18. A method for improved disk rotation rate control as defined in claim 13, wherein the difference error is determined based on a difference between a predetermined target spindle rotation rate parameter and a measured spindle rotation rate parameter.

19. A method for improved disk rotation rate control as defined in claim 13, wherein the motor current measurement at each of the calibration positions is performed over 300 disk rotations.

20. A method for improved disk rotation rate control as defined in claim 13, wherein the motor current measurement at each of the calibration positions is performed using more than 100 disk rotations.

21. A method for improved disk rotation rate control as defined in claim 13, wherein the first calibration position is at about one-third of a distance between an inner-most track radial location and an outer-most track radial location, and the second calibration position is at about two-thirds of the distance between the inner-most track radial location and the outer-most track radial location.

22. A method for improved disk rotation rate control as defined in claim 13, wherein the first calibration position is located substantially at an inner-most track radial location, and the second calibration position is located substantially at an outer-most track radial location.

23. A method for improved disk rotation rate control as defined in claim 13, wherein a difference between the current measurements at the first and second calibration positions is between 4 and 6 percent.

24. A method for improved disk rotation rate control as defined in claim 13, wherein a difference between the current measurements at the first and second calibration positions is between 2 and 4 percent.

* * * * *